United States Patent [19]

Ehnert

[11] Patent Number: 4,627,773

[45] Date of Patent: Dec. 9, 1986

[54] RIGHT ANGLE SPINDLE FOR MACHINE TOOLS

[76] Inventor: Richard E. Ehnert, 690 Persian Dr., #82, Sunnyvale, Calif. 94086

[21] Appl. No.: 253,898

[22] Filed: Apr. 13, 1981

[51] Int. Cl.$^4$ .............................................. B23C 1/12
[52] U.S. Cl. .................... 409/215; 408/137
[58] Field of Search ............... 409/215, 144, 214, 230, 409/211; 408/137

[56] References Cited

U.S. PATENT DOCUMENTS

| | | | |
|---|---|---|---|
| 647,311 | 4/1900 | Maxwell et al. | 408/137 |
| 1,343,180 | 6/1920 | Maddox | 408/137 |
| 1,976,107 | 10/1934 | Archea | 409/215 |
| 1,989,007 | 1/1935 | Gorton | 409/215 |
| 2,331,179 | 10/1943 | Fossum | 408/137 |
| 2,342,829 | 2/1944 | Armitage | 409/215 X |
| 2,601,434 | 6/1952 | DuBois | 408/137 X |
| 2,646,699 | 7/1953 | Mueller | 408/137 X |
| 2,669,162 | 2/1954 | Arliss | 409/215 |
| 3,037,429 | 6/1962 | Schurger | 409/215 |
| 3,163,081 | 12/1964 | Vickers | 409/230 |
| 3,411,384 | 11/1968 | Ver Nooy | 408/137 |

*Primary Examiner*—William R. Briggs

*Attorney, Agent, or Firm*—Thomas Schneck

[57] ABSTRACT

A spindle which may be connected to machine tools, taking power from a rotating power shaft of the machine for advancing and retracting a rotating tool at right angles to the power shaft of the machine. The spindle has a rearward uniform diameter screw which projects through a feed nut and into a hollow headstock. The feed nut has threads engaging the threads of the screw, together with an adjacent hollow section which seats an annular thrust bearing, as well as a rear collar of the headstock which constrains the headstock to move with the feed nut. Power is transferred to the headstock by means of a rotating quill, coaxial with the screw, but axially constrained within a housing. The quill is provided with a lengthwise keyway which is colinear with a similar, but much longer keyway in the headstock. The headstock is able to axially slide back and forth through the quill as the headstock is pushed and pulled by the feed nut moving on the screw. Rotary motion is provided to the quill by means of an annular beveled gear surrounding the quill, meshing with another beveled gear, at right angles, connected to a power shaft communicating with the power shaft of the machine tool.

8 Claims, 8 Drawing Figures

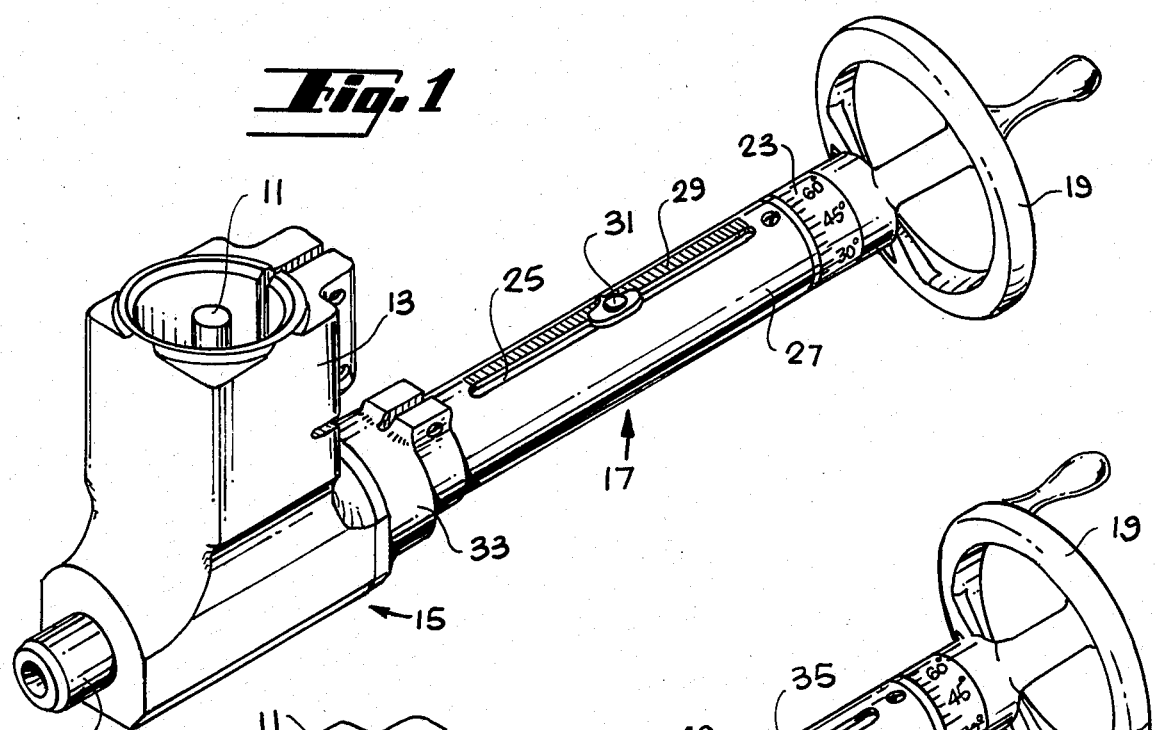
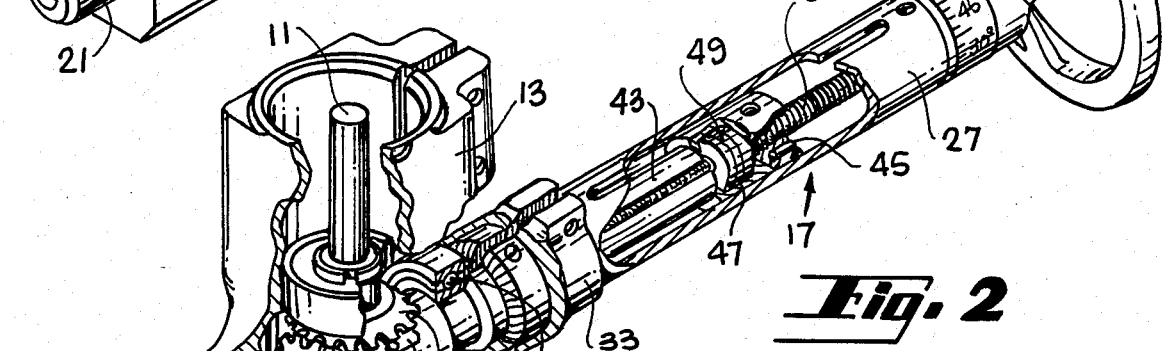
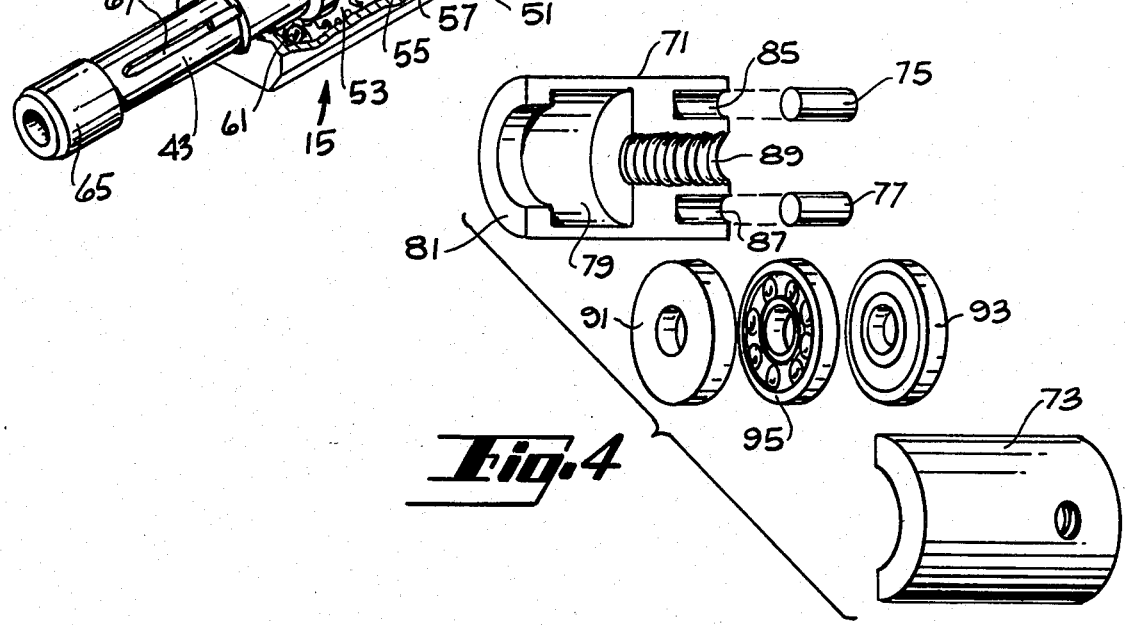

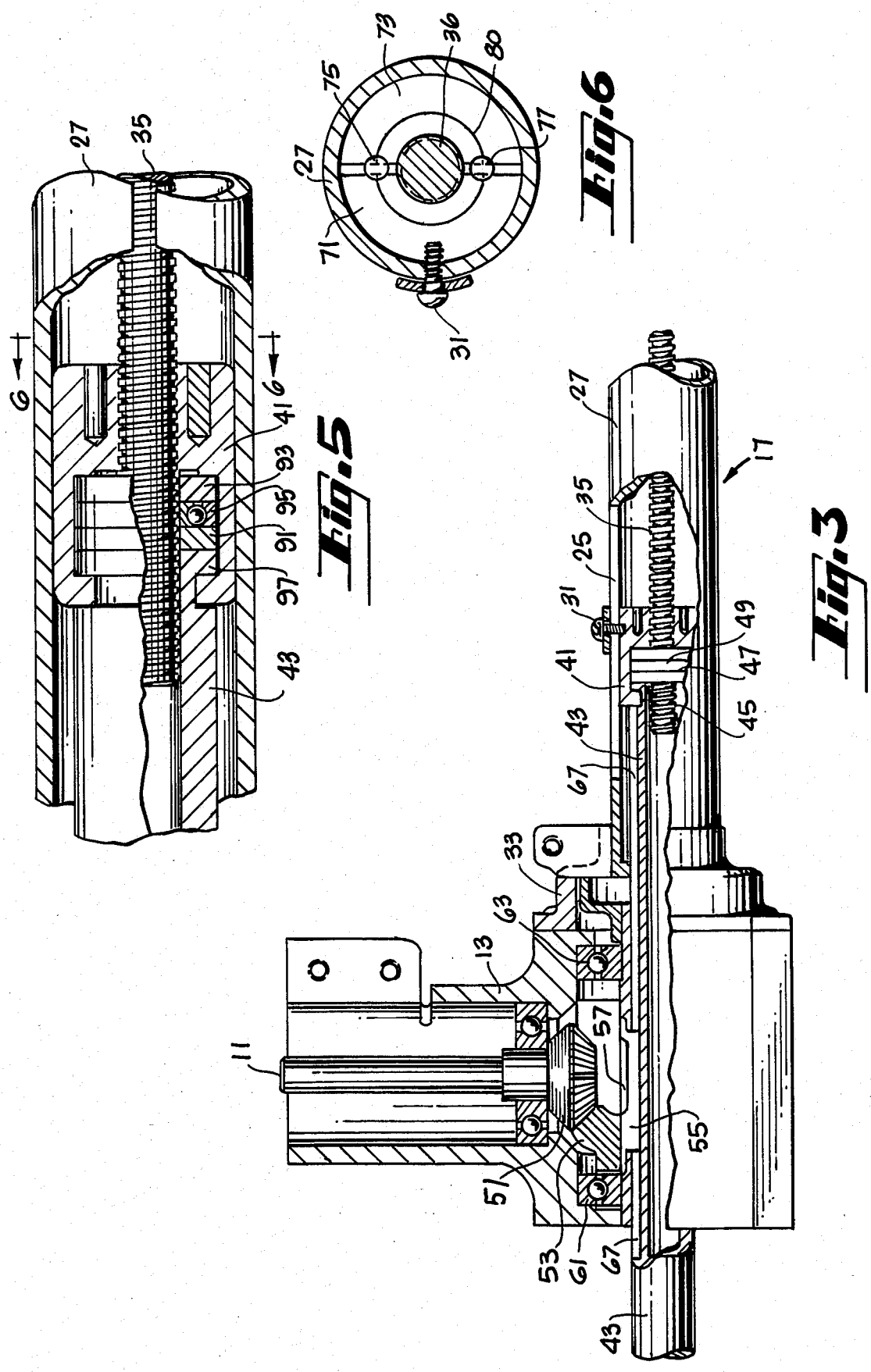

RIGHT ANGLE SPINDLE FOR MACHINE TOOLS

TECHNICAL FIELD

The invention relates to a right angle tool head for a machine tool.

In machine shops, it is frequently necessary to work large pieces at lateral angles relative to a machine tool, such as a milling machine. Although most milling machines are well equipped for precision vertical adjustments, very little lateral capability is provided in machine designs.

BACKGROUND ART

Previously, others have recognized the need for a right angle attachment for a machine tool, including a feed means for attachment of the tool. For example, U.S. Pat. No. 1,989,007 to G. Gorton and U.S. Pat. No. 1,976,107 to Archea are illustrative of the prior art. One of the problems experienced in the prior art is in maintaining tension against a rotating tool, while working. In particular, it is difficult to achieve very small incremental advances and retractions of a rotating machine tool in right angle drives. While such incremental motions are readily available for vertical tool motion, it is difficult to achieve such motions at right angles to the main power shaft of a machine tool, while the machine is working.

DISCLOSURE OF INVENTION

In accord with the present invention, both rotary and incremental linear motion may be provided to a driven shaft at right angles to the power shaft of a machine tool. The driven shaft has a rearward uniform diameter screw colinear with the lengthwise axis of a hollow headstock. The headstock terminates at its rearward end in an annular collar and at the opposite or forward end in a tool holding member. Between the two ends, the hollow headstock has a peripheral lengthwise keyway. A novel feed nut is adapted to engage threads of the screw and transfer linear motion imparted from the screw to the tool holding member in the following way. A hollow section of the feed nut seats an annular thrust bearing, as well as the collar of the headstock. The collar is free to rotate within the nut, which only moves linearly with respect to the screw. Axial motion of the feed nut, forced by the screw is transferred to the headstock so that the headstock moves axially, while it is rotating.

A rotating quill, coaxial with the screw, but fixed relative to axial or lengthwise motion, has a lengthwise keyway, adapted to communicate rotational motion by slidably engaging the hollow headstock keyway. Quill rotation is provided by a power shaft extending at right angles to the quill and transferring rotational power thereto by means of bevel gears.

In summary, the headstock receives rotary motion from the quill and axial or lengthwise motion from the screw, coupled through the feed nut. The thrust bearing permits axial tension against the headstock while it is rotating, so that cutting tools can exert appropriate force against work from lateral angles relative to a machine tool.

BRIEF DESCRIPTION OF DRAWINGS

FIG. 1 is a perspective view of a right angle spindle in accord with the present invention.

FIG. 2 is a perspective cutaway of the spindle of FIG. 1.

FIG. 3 is an enlarged side cutaway view of the power transfer assembly of the spindle of FIG. 1, including the feed nut assembly of FIG. 4.

FIG. 4 is an exploded perspective view of the feed nut of the spindle of FIG. 1.

FIG. 5 is a side cutaway view of the feed nut assembly of the spindle of FIG. 1.

FIG. 6 is a sectional view of the feed nut of the spindle of FIG. 4, taken along lines 6—6.

BEST MODE FOR CARRYING OUT THE INVENTION

Figure 7:
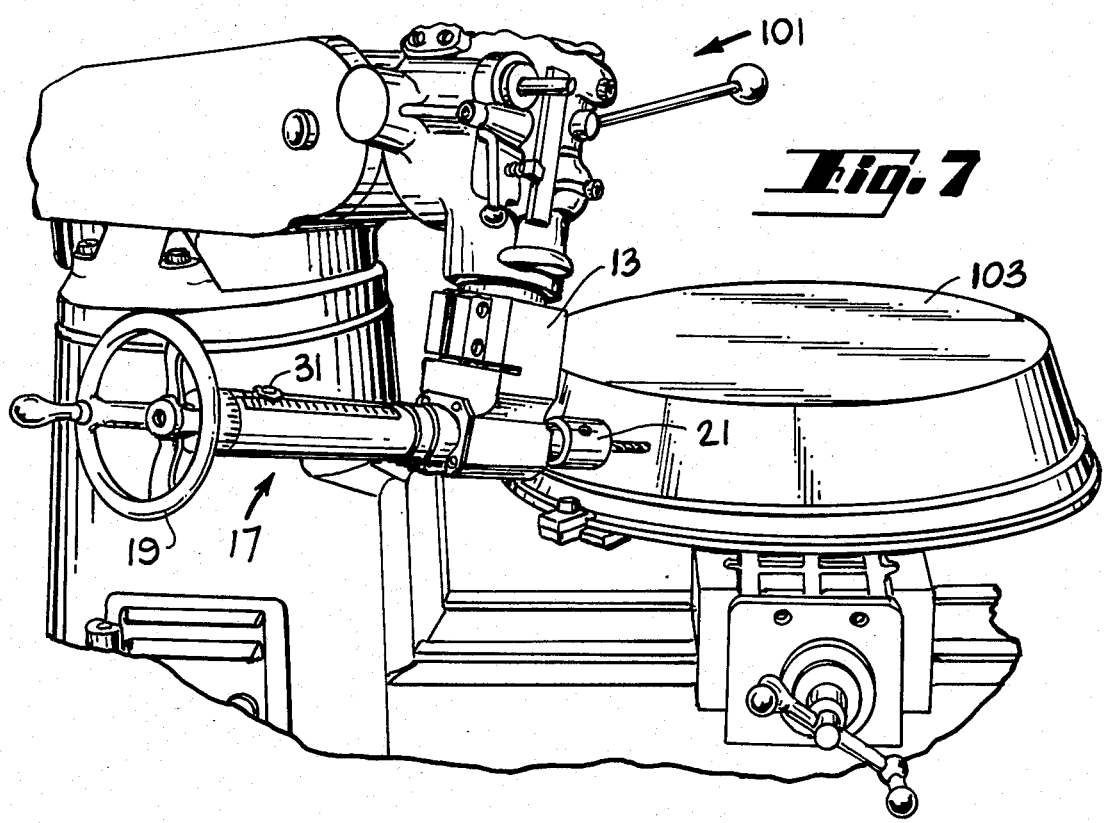
FIG. 7 is a perspective view of a machine tool working the outside diameter of a large piece, using the right angle spindle of the present invention.

Referring to FIG. 1, the right angle drive attachment of the present invention may be seen to include a power shaft 11 within housing 13, adapted to clamp onto commercially available machine tools, such as Bridgeport mills and the like. The housing 13 is part of a forward shaft portion 15 which is adjacent to a rearward shaft portion 17. The forward and rearward shaft portions are coaxial and at right angles to power shaft 11. The rearward shaft 17 terminates in a hand wheel 19 which advances and retracts a tool held by the tool holding member 21 at the forward end of a headstock. Incremental forward motion is indicated by circumferential degree indicia 23, adjacent to hand wheel 19. A lengthwise slot 25 in the fixed tube 27 has a distance scale 29 along side slot 25. As a screw is advanced, a feed nut carries pointer 31 axially along the slot, indicating distance in the manner described below. A shroud 33 joins the rearward shaft portion 17 to forward portion 15.

With reference to FIGS. 2 and 3, the details of the right angle drive attachment of FIG. 1 may be seen. The rearward shaft portion 17 is seen to have a uniform diameter screw 35 connected at the rearward end to hand wheel 19 and having a forward end passing through feed nut 41 and into the center of the hollow headstock 43. Feed nut 41 has a rearward portion which is internally threaded with threads 45 which mate with screw 35. As screw 35 is turned by hand wheel 19, the feed nut 41 is advanced and retracted by means of threads 45 following the pitch of the screw. The feed nut has an adjacent hollow section 47 which seats an annular thrust bearing 49, as well as an annular collar at the rearward end of headstock 43. The axis of headstock 43 and feed nut 41 are colinear with the axis of screw 35. The forward shaft portion 15 includes housing 13 with power shaft 11 terminating in a horizontal beveled gear 51. Housing 13 has an axial bore colinear with the screw axis and seating a quill 55. The quill passes through the center of vertical beveled gear 53 which meshes with horizontal beveled gear 51. The horizontal and vertical beveled gears 51 and 53 transfer power from power shaft 11 to quill 55, causing rotation of the quill. The quill has a lengthwise keyway 57 which may be used to hold the vertical beveled gear 53 in place. The keyway extends most of the length of the quill. The quill is constrained from axial motion by housing 13. Thus, although quill 55 may freely rotate, housing 13 prevents forward or rearward motion. Quill 55 is supported by bearings 61 and 63 at opposite ends of the housing. Quill 55 is preferably made of bronze or other soft metal suited for rotation in housing 13.

Passing through the center of quill 55 is the hollow headstock 43 having a tool holding member 65 at its forward end and the annular collar, previously described, at its rearward end within the feed nut 41. Along the length of headstock 43 is a lengthwise keyway 67. This keyway slides in the axial or lengthwise dimension past quill keyway 57. A key, held in place by the vertical beveled gear 53 locks quill 55 to headstock 43 with regard to rotational motion, but permits the headstock 43 to slide axially through the quill when driven by the feed nut 41. The shroud 33 connects the stationary tube 27, housing screw 35, feed nut 41 and the rearward end of headstock 43 to housing 13. Pointer 31 is secured to the feed nut and rides in a slot 25 defined along the length of tube 27.

With reference to FIG. 4, details of feed nut 41 may be seen. The feed nut is milled, then cut in half in the lengthwise direction, leaving halves 71 and 73. A pair of spacer pins 75 and 77 rest in corresponding semi-cylindrical grooves 85 and 87 where they are adhesively secured in place. Feed nut half 71 is spaced approximately 2 mm from feed nut half 73 by means of the pins 75 and 77. The feed nut may be seen to have a threaded section 89 wherein the threads are axially symmetric and are adapted to mate with the threads of screw 35. An adjacent hollow section 79 of the feed nut has a forward rim 81 adapted to secure a collar of the headstock, not shown, within hollow section 79. Also within hollow section 79 is the thrust bearing, between the headstock collar and the threaded portion 89. The thrust bearing is shown to have component thrust washers 91 and 93, as well as a roller bearing member 95, having a number of ball bearings disposed in an annulus. Note that the thrust bearing components are all annular, for allowing the screw 35 to pass through the center of the thrust bearing unimpeded. Similarly, the headstock is hollow, also permitting the screw 35 to actually pass through the center thereof.

With reference to FIG. 5, the screw 35 may be seen within the fixed tube 27, passing through feed nut 41. The hollow section of the feed nut contains the thrust bearing consisting of the thrust washers 91 and 93, as well as the annular ball bearing member 95. For the first time, the annular collar 97 of the hollow headstock 43 may be seen. Screw 35 may be seen partially penetrating the hollow center of the headstock.

With regard to the sectional view of FIG. 6, the split halves 71, 73 of the feed nut may be seen to be spaced by the pins 75 and 77. The feed nut is shown within tube 27, with pointer 31, projecting through the tube. The dashed line 36 indicates the smallest diameter of screw 35, while solid line 80 indicates the inside diameter of rim 81 in FIG. 4. The reason that the feed nut is first milled, then cut in half and spaced by the spacer pins is so that the feed nut may be assembled in a manner so as to capture annular collar 97 of headstock 43, as shown in FIG. 5. Once the collar 97 is seated adjacent to the thrust bearing, the feed nut may be assembled, with pins 75 and 77 adhesively securing feed nut halves 71 and 73 together.

Figure 8:
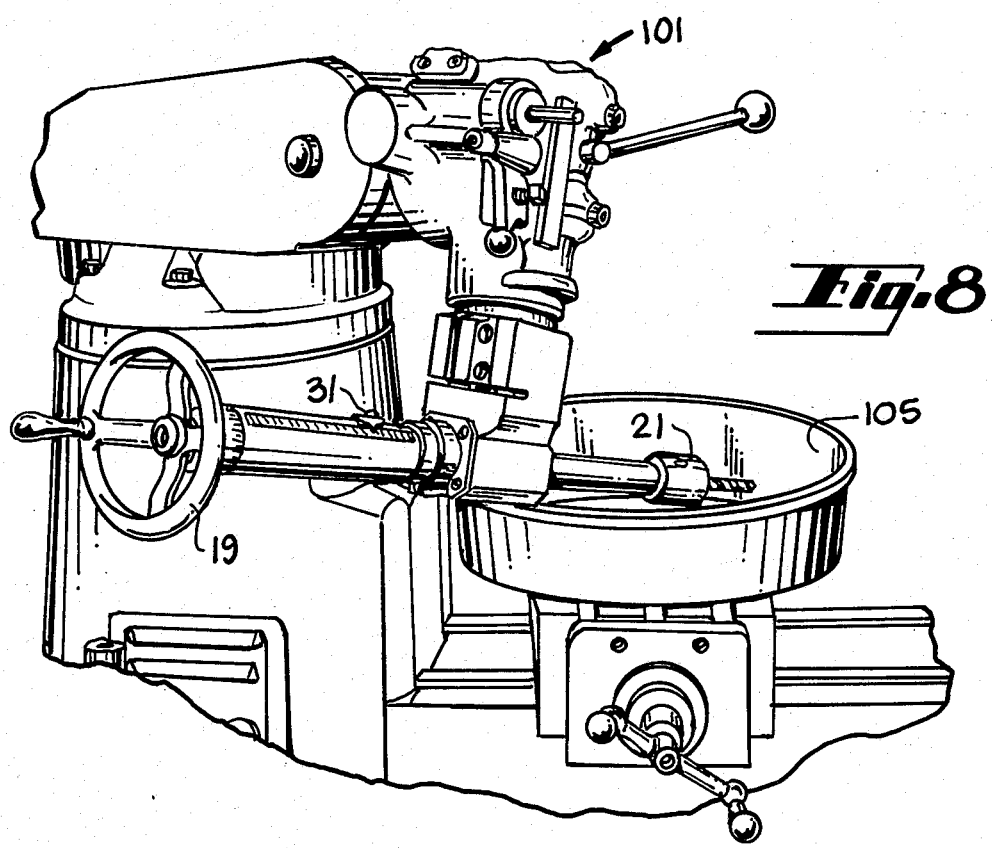
FIG. 8 is a perspective view of a machine tool working the inside diameter of a large piece, using the right angle spindle of the present invention.

With reference to FIG. 7, a mill 101 may be seen having housing 13 connected for receiving power into the vertical power shaft within the housing. The rearward shaft portion 17 is easily accessible so that the hand wheel 19 may be rotated, advancing the headstock and the tool holding member 21 which is working against the outside diameter of large piece 103. It will be noted that the headstock is retracted, as indicated by the position of pointer 31, close to hand wheel 19. On the other hand, in FIG. 8 the headstock is extended so that the tool holding member 21 is at a far reach, as indicated by pointer 31 enabling a tool to work the inside diameter of a large piece 105. As the machine tool 101 supplies rotary power to the tool, the hand wheel 19 may be turned to either advance or retract the tool incrementally, or maintain tension. In contrast to the prior art, both motions may be transmitted to the tool simultaneously. Incremental advancing or retracting motion may be provided while simultaneously, the tool member 21 is rotating.

I claim:

1. A system for advancing and retracting a rotating tool such as a drill bit, comprising, a uniform diameter screw colinear with a lengthwise axis of a hollow headstock, the hollow headstock terminating at one end in an annular collar, the hollow headstock having a peripheral lengthwise keyway, and terminating at another end in a tool holding member, a feed nut having a threaded section adapted to engage threads of the screw and an adjacent hollow section seating an annular thrust bearing, the screw passing through the thrust bearing, the hollow section terminating in a rim engaging said collar whereby the collar may rotate relative to the rim but may not move lengthwise with respect thereto, a rotating quill, supported in a housing by opposed bearings, the quill disposed coaxial with the screw, but fixed relative to axial motion, said quill having a lengthwise keyway adapted to communicate rotational motion by slidably engaging the hollow headstock keyway and simultaneously permitting lengthwise bidirectional motion of the headstock along the keyway, whereby lengthwise motion may be transferred to the hollow headstock by the screw while simultaneously the headstock is rotating, said quill having a first gear connected coaxially thereto, and power shaft means having a second gear extending at a right angle to the first gear of the quill and meshing therewith at all times for causing quill rotation, thereby rotating the headstock.

2. A right angle drive attachment for milling machines and the like for advancing and retracting a rotating tool comprising, a power shaft having a drive gear, a driven shaft at a right angle to the power shaft, the driven shaft having, a rearward shaft portion having a gradually rotatable, uniform diameter screw extending lengthwise along the driven shaft axis, a feed nut having a threaded section adapted to engage threads of the screw and an adjacent hollow section seating an annular thrust bearing, the screw passing through the thrust bearing, the hollow section terminating in a rim engaging a collar defined at the end of a rotary, axially hollow headstock, colinear with the screw and having a peripheral lengthwise keyway, and a forward shaft portion comprising a fixed housing receiving the power shaft and having an axial bore with two spaced apart bearings supporting a quill axially disposed along the driven shaft axis, the rotary headstock axially extending through the quill, the quill adapted for rotary motion and seating an annular gear, meshing with the drive gear of the power shaft for receiving power therefrom, the annular gear coaxial with the quill, in rotary power transfer relation therewith, the quill constrained by the housing against axial motion, said quill having a lengthwise keyway adapted to communicate rotary power to the headstock keyway, and simultaneously permitting lengthwise bidirectional motion of the headstock along the keyway, whereby variable amounts of lengthwise motion may be transmitted to the headstock by the screw and rotary power may be simultaneously transferred to the headstock from the power shaft.

3. The drive of claim 1 or 2 wherein the feed nut is split lengthwise in spaced apart halves.

4. The drive of claim 3 wherein the feed nut halves are spaced apart a pair of pins.

5. The drive of claim 1 or 2 further defined by a fixed tube at the rearward portion of the driven shaft, the tube coaxially spaced from said screw and providing an enclosure for the feed nut.

6. The drive of claim 5 further defined by a lengthwise slot in said fixed tube parallel to the driven shaft axis, a distance scale adjacent to the slot and a pointer mounted on the feed nut and extending through the slot, indicating tool chuck advance by the position of the pointer.

7. The drive of claim 6 further defined by a hand wheel connected to the screw at the end of the fixed tube, the tube having circumferential degree indicia and the hand wheel having a mark adjacent to said indicia for indicating degreewise hand wheel rotation.

8. The drive of claim 1 or 2 further defined by a pair of annular bearings disposed in said housing coaxially supporting opposite ends of the quill.

* * * * *